US010007770B2

(12) United States Patent
Chang

(10) Patent No.: US 10,007,770 B2
(45) Date of Patent: Jun. 26, 2018

(54) TEMPORARY SECURE ACCESS VIA INPUT OBJECT REMAINING IN PLACE

(71) Applicant: Synaptics Incorporated, San Jose, CA (US)

(72) Inventor: Yi-Yun Chang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 197 days.

(21) Appl. No.: 14/805,079

(22) Filed: Jul. 21, 2015

(65) Prior Publication Data

US 2017/0024553 A1     Jan. 26, 2017

(51) Int. Cl.
*G06F 7/04*     (2006.01)
*G06F 21/32*     (2013.01)
*G06K 9/00*     (2006.01)
*G06F 3/0488*     (2013.01)
*G06F 3/0354*     (2013.01)

(52) U.S. Cl.
CPC .......... *G06F 21/32* (2013.01); *G06F 3/03547* (2013.01); *G06F 3/0488* (2013.01); *G06K 9/00013* (2013.01); *G06F 2203/04808* (2013.01); *G06F 2221/2139* (2013.01)

(58) Field of Classification Search
CPC ........... G06F 21/32; G06F 2203/04808; G06F 2221/2139; G06F 3/03547; G06F 3/0488; G06K 9/00013; G06K 9/00087; G06K 9/00006
See application file for complete search history.

(56) References Cited

U.S. PATENT DOCUMENTS

| | | | |
|---|---|---|---|
| 6,360,004 B1 | 3/2002 | Akizuki | |
| 6,941,001 B1 | 9/2005 | Bolle et al. | |
| 8,049,597 B1* | 11/2011 | Murakami | G06F 21/32 340/5.1 |
| 8,483,772 B2 | 7/2013 | Naftolin | |
| 2008/0267465 A1* | 10/2008 | Matsuo | A63F 13/10 382/126 |
| 2012/0131471 A1 | 5/2012 | Terlouw et al. | |
| 2014/0112555 A1 | 4/2014 | Fadell et al. | |
| 2014/0283141 A1 | 9/2014 | Shepherd et al. | |
| 2015/0106765 A1 | 4/2015 | Lee et al. | |

* cited by examiner

*Primary Examiner* — Abiy Getachew
(74) *Attorney, Agent, or Firm* — Leydig, Voit & Mayer, Ltd

(57) ABSTRACT

An input device for an electronic system includes: an input surface, configured to provide an interface for determining positional information for an input object in a sensing region of the input device; a biometric sensor, configured to determine biometric information about a user; and a processing system, configured to: in response to placement of a valid biometric object on the biometric sensor, enable access to a secure object of the electronic system while the valid biometric object is maintained on the biometric sensor; and disable access to the secure object of the electronic system in response to removal of the valid biometric object from the biometric sensor.

20 Claims, 9 Drawing Sheets

TEMPORARY SECURE ACCESS VIA INPUT OBJECT REMAINING IN PLACE

BACKGROUND

Input devices including proximity sensor devices (also commonly called touchpads or touch sensor devices), as well as fingerprint sensors, are widely used in a variety of electronic systems. Proximity sensor devices typically include a sensing region, often demarked by a surface, in which the proximity sensor device determines the presence, location and/or motion of one or more input objects. Fingerprint sensors also typically include a sensing region in which the fingerprint sensor determines presence, location, motion, and/or features of a fingerprint or partial fingerprint.

Proximity sensor devices and fingerprint sensors may be used to provide interfaces for the electronic system. For example, proximity sensor devices and fingerprint sensors are often used as input devices for larger computing systems (such as opaque touchpads and fingerprint readers integrated in, or peripheral to, notebook or desktop computers). Proximity sensor devices and fingerprint sensors are also often used in smaller computing systems (such as touch screens integrated in cellular phones). Such devices and sensors are often susceptible to a variety of types of noise. In certain instances, signal quality is significantly degraded if such noise is not rejected by the system.

SUMMARY

In an exemplary embodiment, an input device for an electronic system is provided. The input device includes: an input surface, configured to provide an interface for determining positional information for an input object in a sensing region of the input device; a biometric sensor, configured to determine biometric information about a user; and a processing system, configured to: in response to placement of a valid biometric object on the biometric sensor, enable access to a secure object of the electronic system while the valid biometric object is maintained on the biometric sensor; and disable access to the secure object of the electronic system in response to removal of the valid biometric object from the biometric sensor.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The following detailed description is merely exemplary in nature. There is no intention to be bound by any expressed or implied theory presented in the present disclosure.

Various embodiments of the present invention provide input devices and methods that facilitate improved usability.

Figure 1:
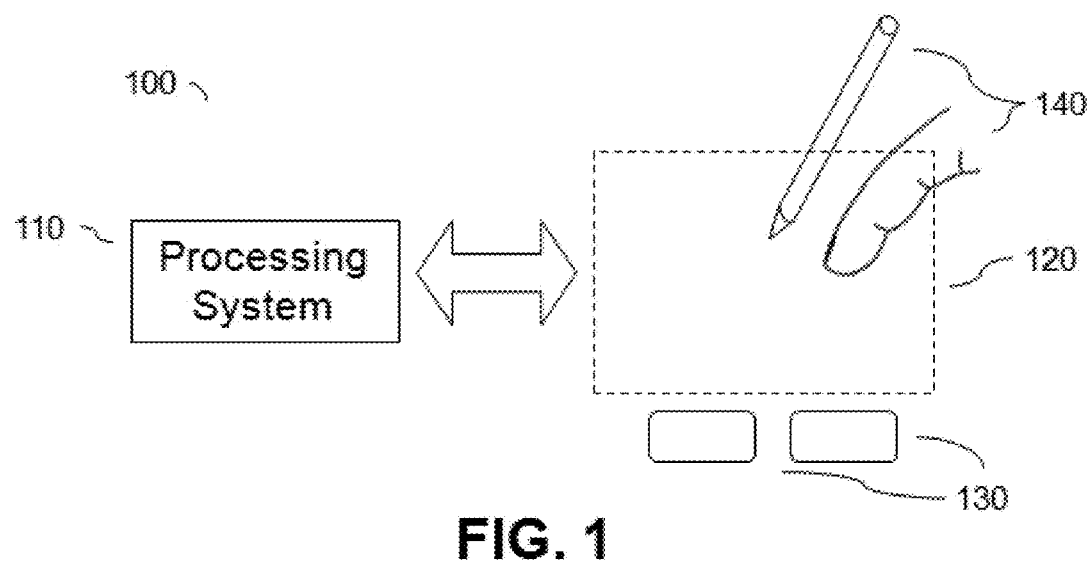
FIG. 1 is a block diagram of an exemplary environment for a touch sensor input device.

FIG. 1 is a block diagram of an exemplary environment for a touch sensor input device 100. The touch sensor input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The touch sensor input device 100 can be implemented as a physical part of the electronic system, or can be physically separate from the electronic system. As appropriate, the touch sensor input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the touch sensor input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the touch sensor input device 100 in which the touch sensor input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the touch sensor input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the touch sensor input device 100, contact with an input surface (e.g. a touch surface) of the touch sensor input device 100, contact with an input surface of the touch sensor input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the touch sensor input device 100.

The touch sensor input device 100 may utilize any combination of sensor components and sensing technologies to detect user input in the sensing region 120. The touch sensor input device 100 comprises one or more sensing elements for detecting user input. For example, the touch sensor input device 100 may use capacitive techniques, where voltage or current is applied to create an electric field. Nearby input objects cause changes in the electric field, and produce detectable changes in capacitive coupling that may be detected as changes in voltage, current, or the like. As several other non-limiting examples, the touch sensor input device 100 may also use elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the touch sensor input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the touch sensor input device 100, one or more sensing elements pick up loop currents induced by a resonating coil or pair of coils. Some combination of the magnitude, phase, and frequency of the currents may then be used to determine positional information.

In some capacitive implementations of the touch sensor input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the touch sensor input device 100. The processing system 110 is configured to operate the hardware of the touch sensor input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. Further, a processing system for a self capacitance sensor device may comprise driver circuitry configured to drive absolute capacitance signals onto sensor electrodes, and/or receiver circuitry configured to receive signals with those sensor electrodes. In one more embodiments, a processing system for a combined mutual and self capacitance sensor device may comprise any combination of the above described mutual and self capacitance circuitry. In some embodiments, the processing system 110 also comprises electronically-readable instructions, such as firmware code, software code, and/or the like. In some embodiments, components composing the processing system 110 are located together, such as near sensing element(s) of the touch sensor input device 100. In other embodiments, components of processing system 110 are physically separate with one or more components close to sensing element(s) of touch sensor input device 100, and one or more components elsewhere. For example, the touch sensor input device 100 may be a peripheral coupled to a computing device, and the processing system 110 may comprise software configured to run on a central processing unit of the computing device and one or more ICs (perhaps with associated firmware) separate from the central processing unit. As another example, the touch sensor input device 100 may be physically integrated in a mobile device, and the processing system 110 may comprise circuits and firmware that are part of a main processor of the mobile device. In some embodiments, the processing system 110 is dedicated to implementing the touch sensor input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the touch sensor input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the touch sensor input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the touch sensor input device 100. Other types of additional input components include sliders, balls, wheels, switches, and the like. Conversely, in some embodiments, the touch sensor input device 100 may be implemented with no other input components.

In some embodiments, the touch sensor input device 100 comprises a touch screen interface, and the sensing region 120 overlaps at least part of an active area of a display screen. For example, the touch sensor input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The touch sensor input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
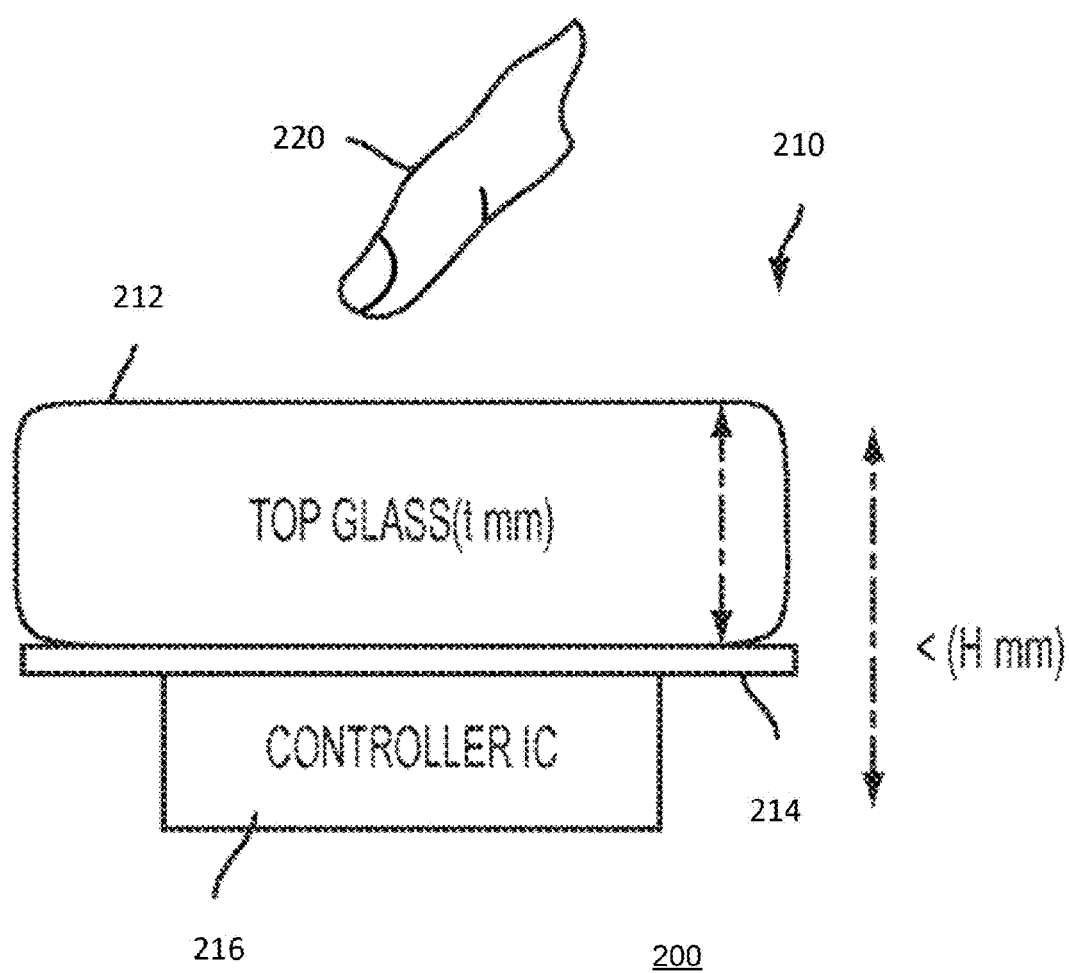
FIG. 2 is a block diagram of an exemplary environment for a biometric sensor input device.

FIG. 2 is a block diagram 200 of an exemplary environment for a biometric sensor input device 210. The biometric sensor input device 210 is configured for sensing biometric characteristics of a user, such as a fingerprint from a user finger 220. The sensor may be formed on the surface of a top glass 212, which may be part of a display screen, such as a touch screen. In other embodiments, the sensor may be located on a button, or in a dedicated fingerprint sensing location. According to the illustrated embodiment, on the underside of the glass layer 212 over which the finger 220 of the user may be placed or swiped, may be formed a layer 214 of material, which may be a dielectric and may be flexible, such as a film of Kapton® tape, which may have sensor element electrodes/traces formed on one or both opposing surfaces and may also have mounted thereon, e.g., by a chip on film (COF) or flip chip mounting technique, a sensor controller IC 216 to the substrate containing the sensor element electrodes/traces. As noted in this application, for some embodiments, the entire assembly may be on the order of less than 1 mm in thickness H, e.g., on the order of 0.1 mm in thickness, especially for COF types of packaging when considered without the thickness of the IC, such as when the IC is separate from the sensor. Also, depending on acceptable signal level, the thickness may be on the order of 2 mm or even thicker, e.g., for flip chip mounting packages.

While one exemplary implementation of a fingerprint sensor is illustrated in FIG. 2, it should be appreciated that sensors according to the exemplary embodiments described herein may be beneficially utilized in a wide variety of fingerprint sensor designs and implementations.

Figure 3:
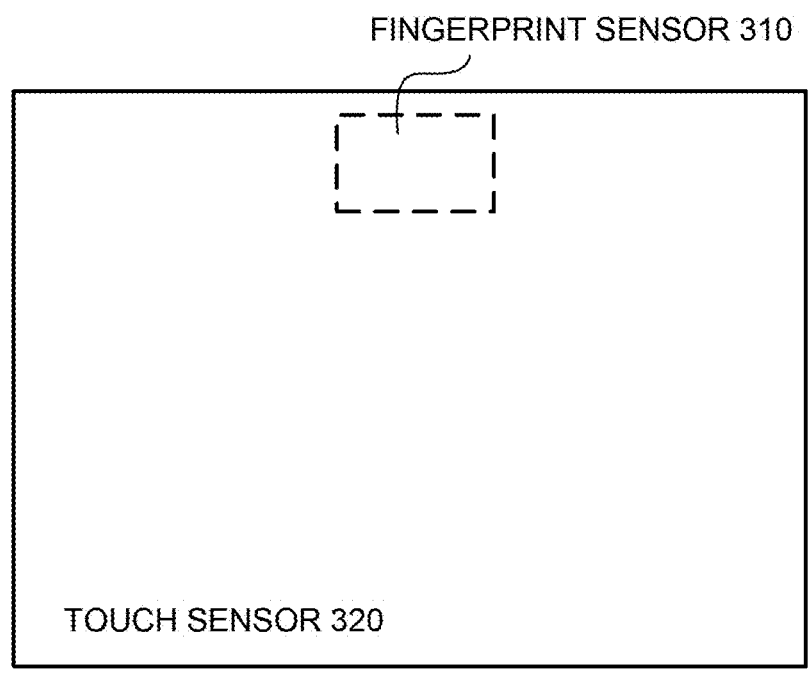
FIG. 3 is a block diagram of an exemplary environment for an input device that includes both a biometric sensor and a touch sensor.

FIG. 3 is a block diagram of an exemplary environment for an input device 300 that includes both a biometric sensor 310 and a touch sensor 320 (viewed from the top). In the example depicted in FIG. 3, the user interface for the biometric sensor 310 (in this example, a fingerprint sensor), is integrated with the user interface for the touch sensor 320. It will be appreciated that in other embodiments, the user interface for the biometric sensor 310 may be separate from the user interface for the touch sensor 320.

In one example, the touch sensor 320 and the biometric sensor 310 are both part of a touchpad input device, which, for example, may be a component of a laptop computer (and thus may have an opaque interface). In another example, the touch sensor 320 and/or the biometric sensor 310 are integrated/overlap with a touch screen display, which, for example, may be a component of a mobile computing device such as a tablet computer or a smartphone (and thus should have a transparent interface).

It will be appreciated that computing devices usable in connection with the input device 300 may include corresponding data storage upon which system and user files may be stored. A user may have certain user files, for example, relating to the user's personal information, medical records, financial records, and/or other private or confidential files that the user does not wish other individuals to have access to (e.g., individuals who physically use the computing device, or individuals who access the computing device via a network connection). Attempting to keep these files hidden in a conventional manner, such as by setting certain files and/or folders into a "hidden" mode, is often inadequate to protect the user's privacy, as other users are still able to access such files.

Figure 4:
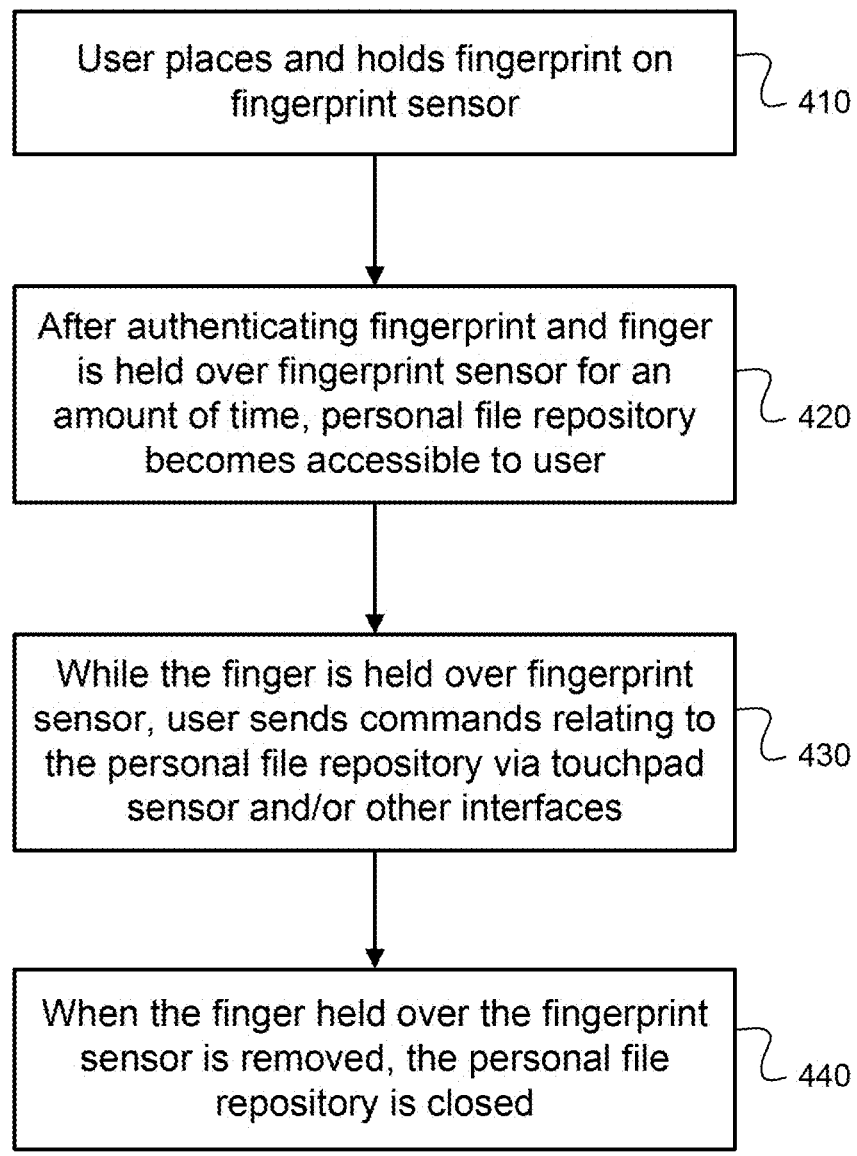
FIG. 4 is a flowchart that illustrates an exemplary biometrically-enhanced mechanism for providing access to a personal file repository.

FIG. 4 is a flowchart 400 that illustrates an exemplary biometrically-enhanced mechanism for providing access to a personal file repository. At stage 410, a user places and holds his or her fingerprint on a fingerprint sensor for at least a predetermined amount of time. At stage 420, the user's fingerprint is authenticated by the fingerprint sensor's processing system, and once the predetermined amount of time has elapsed, a personal file repository (e.g., a personal or secret file folder) is displayed on a screen of the corresponding computing device. In an exemplary implementation, the personal file repository is displayed on the screen so long as the user's finger is held over the fingerprint sensor. Once the user's finger is removed from the fingerprint sensor, the personal file repository is no longer displayed.

Figure 5:
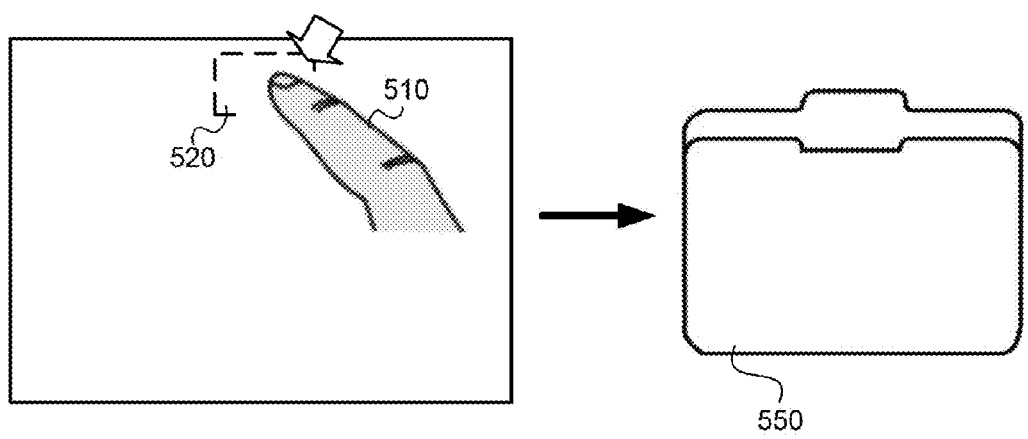
FIG. 5 is a block diagram that illustrates an exemplary mechanism for causing a personal file repository to be displayed.

FIG. 5 is a block diagram 500 that illustrates an exemplary mechanism for causing a personal file repository to be displayed. The user's finger 510 is pressed down over the fingerprint sensor 520, and holding the finger over the fingerprint sensor for the predetermined amount of time causes a personal or secret file folder 550 to be accessed by a corresponding computing device.

In a preferred embodiment, the predetermined amount of time that a user holds his or her fingerprint to initially call up the personal file repository is longer than the time it takes for authentication. It will be appreciated that, in certain embodiments, once a user's fingerprint is enrolled, authentication may be completed merely by tapping on the fingerprint sensor. Thus, by requiring the user to hold his or her fingerprint for a predetermined amount of time that is appreciably longer (such as a 1-5 second delay after completing the authentication), the system ensures that the user is deliberately intending to call up the personal file repository (as opposed to tapping the fingerprint sensor accidentally or using the fingerprint sensor for some other authentication purpose).

Returning to FIG. 4, while the personal file repository is open (which may correspond to the user holding his or her finger over the fingerprint sensor), at stage 430, the user can issue various commands with respect to the personal file repository, for example, by using another finger (such as the thumb of the same hand) on the touch sensor to perform gestures on the touch sensor. The user can also use other input mechanisms (for example, buttons on a touchpad for a laptop or buttons on a touch screen), apart from or in combination with the gestures, to issue other types of commands.

Figure 6:
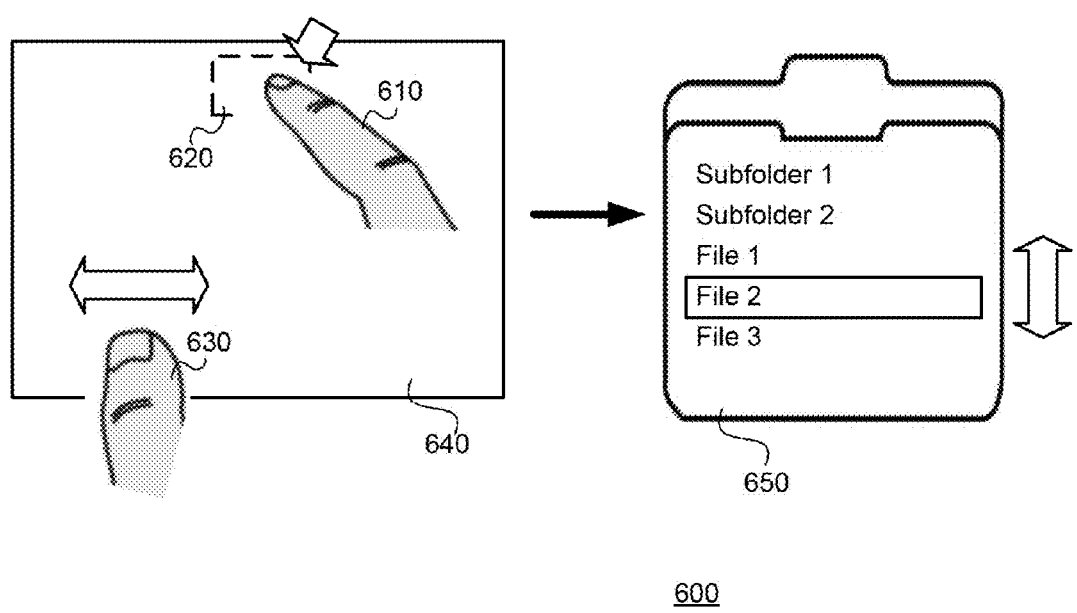
FIG. 6 is a block diagram that illustrates an exemplary mechanism for scrolling through different files or folders of a personal file repository.

FIG. 6 is a block diagram 600 that illustrates an exemplary mechanism for scrolling through different files or folders of a personal file repository. While the personal file repository 650 is kept open by the user's finger 610 being held over the fingerprint sensor 620, the user uses his or her thumb 630 on the touch sensor interface 640 in a swiping motion that allows the user to scroll between different files or folders on a display of a corresponding computing device. For example, if the computing device is a laptop computer and the fingerprint sensor is integrated with a touchpad of the laptop computer, swiping left or right may allow the user to scroll up or down between different files and/or folders that are selected on a screen of the laptop. Once the user has highlighted a desired file or folder to access, the user may then tap (or double-tap) the touch sensor (or activate a button corresponding to a mouse click) to access the file or folder. Actions that may be accomplished through various gestures, while the personal file repository is open, include for example, opening a file for display, moving the file to another folder or subfolder, creating new folders or subfolders, copying a file or folder, renaming files or folders, etc. In an exemplary embodiment, if any modifications are to be made to the personal file repository, a separate validation process may be required before such modifications are registered by the system (e.g., setting, moving, or renaming content of the file repository). Additionally, the files may be, for example, media files such as photographs or videos, documents containing textual information, data files, etc.

Figure 7:
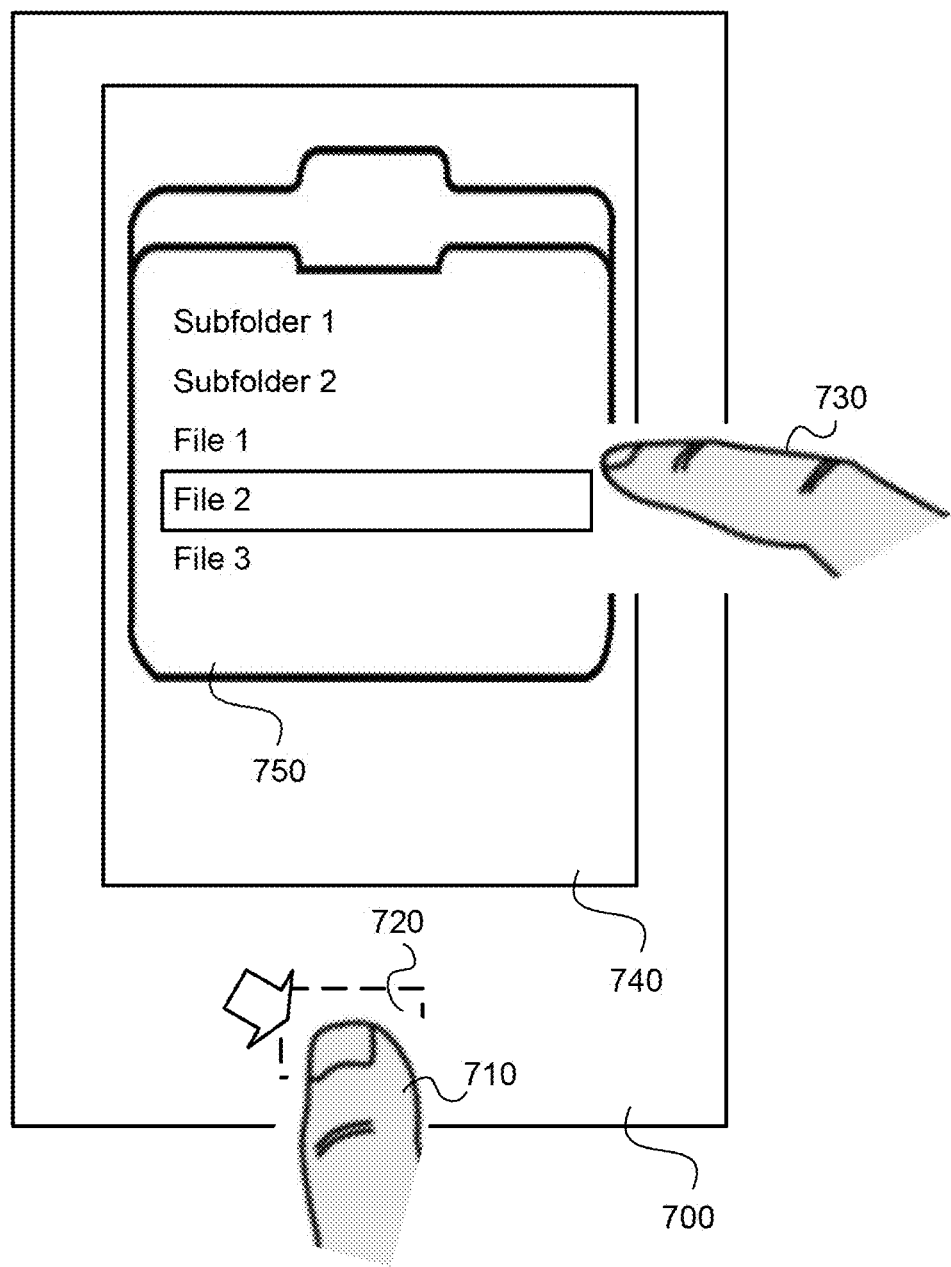
FIG. 7 is a block diagram that illustrates another exemplary mechanism for scrolling through different files or folders of a personal file repository.

FIG. 7 is a block diagram 700 that illustrates another exemplary mechanism for scrolling through different files or folders of a personal file repository. In FIG. 7, the computing device is a smartphone 700 and the fingerprint sensor 720 is located apart from a touch screen interface 740 of the smartphone. The user may hold a finger 710 over the fingerprint sensor 720 with one hand and operate the smartphone with respect to a personal file repository 750 using conventional touch screen gestures with a finger 730 of the other hand (e.g., sliding the finger up and down to scroll, tapping or double-tapping with the finger to select, zooming in or out with two fingers, rotating with two fingers, etc.).

In an exemplary implementation, once a desired file or folder has been accessed, the user may remove the finger placed over the fingerprint sensor, and the desired file or folder that was accessed will persist on the display of the corresponding computing device. This allows continued access to the file or folder that was opened through the biometrically-enhanced gestures, such that the user can view and/or manipulate the contents of the file or folder. In another exemplary implementation, once the finger placed over the fingerprint sensor is removed, everything associated with the personal file repository (including any file or folder accessed from the personal file repository), is closed, such that the file or folder may not be viewed or manipulated.

Additionally, returning to FIG. 4, at stage 440, if the finger held over the fingerprint sensor is removed from the fingerprint sensor, the personal file repository that was accessed disappears. It will be appreciated that the personal file repository may be closed regardless of whether an accessed file or folder from the personal file repository persists or not. For example, in the implementation where accessed files or folders persist, the personal file repository file folder may be closed based on removal of the finger, while the accessed file or folder stays open. In another example, in the implementation where the accessed files or folders do not persist, the personal file repository and any files or folders accessed therefrom are closed upon removal of the finger from the fingerprint sensor. In yet another example, where there was no file or folder accessed from the personal file repository during the time that the finger was held over the fingerprint sensor, the personal file repository simply closes when the finger is removed.

In yet another example, the condition for closing off access to the personal file repository is that both (1) the finger held over the fingerprint sensor and (2) any second input that was present while the finger was held over the fingerprint sensor are removed. For example, if the finger held over the fingerprint sensor is removed, but another finger is still present on the touch sensor, access to the personal file repository remains open. Access to the personal file repository (and/or the files or folders contained therein) is not terminated until both inputs have been removed.

Although the foregoing examples discussed above with respect to FIGS. 4-7 specifically describe access to a personal file repository, it will be appreciated that objects other than a personal file repository may be accessed in this manner. For example, in other implementations, the object being accessed may be a single file, or may be a personalized shortcut/launch menu. In another example, the object being accessed may be a secure transaction path (for example, for automatic validation of banking credentials to access a banking related application or to perform a financial transaction).

Figure 8:
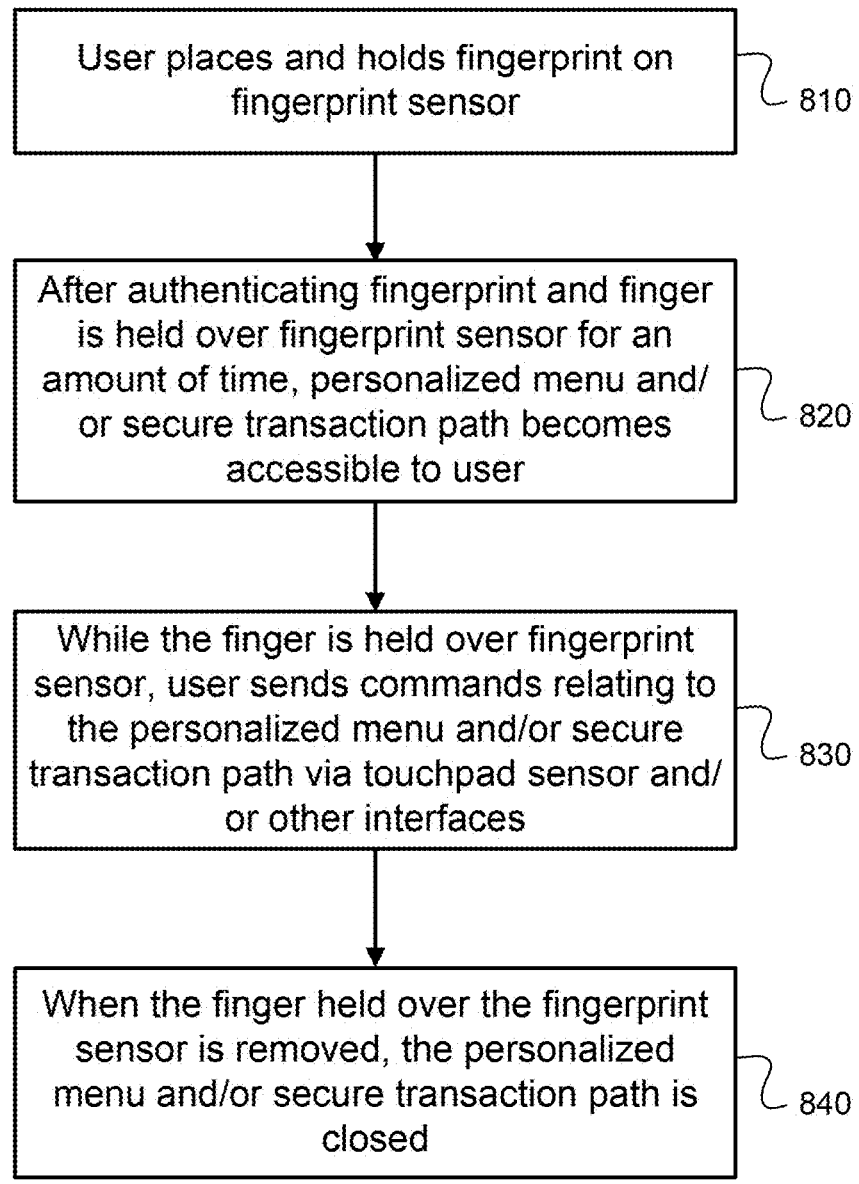
FIG. 8 is a flowchart that illustrates an exemplary biometrically-enhanced mechanism for accessing and using a personalized menu and/or secure transaction path.

FIG. 8 is a flowchart 800 that illustrates an exemplary biometrically-enhanced mechanism for accessing and using a personalized menu and/or secure transaction path. At stage 810, the user places and holds his or her finger on the fingerprint sensor. At stage 820, the system authenticates the user's fingerprint and determines whether the fingerprint is held over the fingerprint sensor for a predetermined amount of time, and, if so, displays a personalized shortcut/launch menu or displays a secure transaction path (e.g., relating to banking applications and/or financial transactions). At stage 830, while the finger corresponding to the fingerprint is held over the fingerprint sensor, the user is able to send commands relating to the personalized menu or secure transaction path, including for example, scrolling and selection commands to access different menu or transaction options, by using a touchpad sensor and/or other input interfaces (such as touchpad buttons or a touch screen interface). At stage 840, when the finger held over the fingerprint sensor is removed (and, in some implementations, additionally when the secondary input corresponding to other user commands is removed), the personalized menu and/or secure transaction path is closed.

Figure 9:
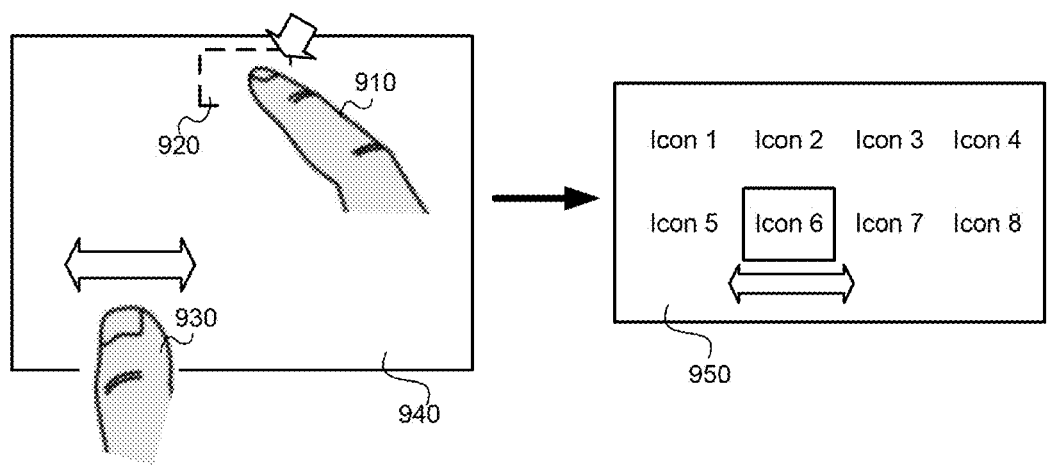
FIG. 9 is a block diagram that illustrates an exemplary mechanism for scrolling through different elements of a personalized menu and/or secure transaction path.

FIG. 9 is a block diagram 900 that illustrates an exemplary mechanism for scrolling through different elements of a personalized menu and/or secure transaction path. In FIG. 9, a user's finger 910 is depicted as being pressed down on and held over a fingerprint sensor 920. In this example, the fingerprint sensor 920 is integrated with a touch sensor 940 of a touchpad (it will be appreciated that in other exemplary implementations, such as smartphone implementations, the fingerprint sensor may be separate from the touch sensor and/or other input interfaces). A second input is provided by another of the user's fingers 930, which is in contact with the touch sensor 940.

The pressing and holding of the user's finger 910 on the fingerprint sensor 920 causes an exemplary personalized menu and/or secure transaction path 950 to be displayed on a screen of a corresponding computing device. The exemplary personalized menu and/or secure transaction path 950 includes several exemplary icons which correspond to different options that the user may select. For example, in an implementation where a personalized shortcut/launch menu is called up, the icons may be arranged in a customized menu of computing applications corresponding to the particular user that was authenticated. In another example, in an implementation where a secure transaction path is called up, the icons may correspond to different functions that may be performed by the corresponding computing device that relate to a banking application or a financial transaction for which user authentication and/or privacy is needed.

In the particular configuration depicted in FIG. 9, a horizontal swiping motion of the user's finger 930 corresponding to the second input allows the user to scroll between different options corresponding to the different exemplary icons. The user is then able to tap (or double-tap) the touch sensor (or activate a button corresponding to a mouse click) to follow-through with a highlighted option.

It will be appreciated that, although exemplary activation of the personal file repository (as discussed above with respect to FIG. 4) and exemplary activation of the personalized menu or secure transaction path (as discussed above with respect to FIG. 8) utilize the same trigger condition (i.e., the user's finger being held over the fingerprint sensor for a period of time), other exemplary embodiments may utilize different trigger conditions such that both functions are available to the user on a single computing device. For example, in one exemplary implementation, accessing the personal file repository may instead be conditioned upon the user's finger being held over the fingerprint sensor for a period of time in combination with a gesture detected by a touch sensor. In another example, the user's finger being held over the fingerprint sensor for a period of time activates a shortcut menu, and accessing the personal file repository may be one of the options on the shortcut menu that the user may select.

The embodiments and examples set forth herein were presented in order to explain exemplary embodiments the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The use of the terms "a" and "an" and "the" and "at least one" and similar referents in the context of the description and the claims are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Variations of the exemplary embodiments discussed herein may become apparent to those of ordinary skill in the art upon reading the foregoing description. The inventors expect skilled artisans to employ such variations as appropriate, and the inventors intend for the principles described herein to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. An input device for an electronic system, comprising:
an input surface, configured to provide an interface for determining positional information for an input object in a sensing region of the input device;
a biometric sensor, configured to determine biometric information about a user; and
a processing system, configured to:
in response to placement of a valid biometric object on the biometric sensor, enable access to a secure object of the electronic system while the valid biometric object is maintained on the biometric sensor; and
disable access to the secure object of the electronic system in response to removal of the valid biometric object from the biometric sensor;
wherein the processing system is further configured to: prior to enabling access to the secure object, authenticate the user based on the determined biometric information so as to determine that the biometric object placed on the biometric sensor is valid;
wherein enabling access to the secure object of the electronic system while the valid biometric object is maintained on the biometric sensor further comprises: causing information to be displayed on a display of the electronic system while the valid biometric object is maintained on the biometric sensor, wherein the displayed information is hidden when the valid biometric object is not on the biometric sensor.

2. The input device according to claim 1, wherein the secure object comprises at least one of the group consisting of:
a file repository stored in a memory of the electronic system;
a personalized menu; and
a secure transaction path.

3. The input device according to claim 1, wherein the processing system is further configured to:
determine that placement of the valid biometric object is maintained for a threshold amount of time before enabling access to the secure object.

4. The input device according to claim 1, wherein the processing system is further configured to:
provide for navigation and selection of items within the secure object based on a second input on the input surface.

5. The input device according to claim 4, wherein disabling the access to the secure object is further based on the second input being removed from the input surface.

6. The input device according to claim 1, wherein the processing system is further configured to, in response to a separate validation process, enable modifications to the secure object.

7. The input device according to claim 1, wherein the input surface overlaps with a display.

8. The input device according to claim 1, wherein the input surface is opaque.

9. The input device according to claim 1, wherein the biometric sensor is configured to utilize the input surface to determine the biometric information about the user.

10. The input device according to claim 1, wherein the biometric sensor comprises a biometric sensor interface separate from the input interface.

11. The input device according to claim 1, wherein the biometric sensor is one of the group consisting of: a capacitive fingerprint sensor; an optical fingerprint sensor; and an ultrasonic fingerprint sensor.

12. A processing system for an input device comprising a touch sensor and a biometric sensor, the processing system comprising:
one or more non-transitory processor-readable media having processor-executable instructions stored thereon;

one or more processors, configured to, based on execution of the processor-executable instructions:
  in response to placement of a valid biometric object on the biometric sensor, enable access to a secure object of the electronic system while the valid biometric object is maintained on the biometric sensor; and disable access to the secure object of the electronic system in response to removal of the valid biometric object from the biometric sensor;
  wherein the one or more processors are further configured, based on execution of the processor-executable instructions, to: prior to enabling access to the secure object, authenticate the user based on the determined biometric information so as to determine that the biometric object placed on the biometric sensor is valid;
  wherein enabling access to the secure object of the electronic system while the valid biometric object is maintained on the biometric sensor further comprises: causing information to be displayed on a display of the electronic system while the valid biometric object is maintained on the biometric sensor, wherein the displayed information is hidden when the valid biometric object is not on the biometric sensor.

13. The processing system according to claim 12, wherein the secure object comprises at least one of the group consisting of:
  a file repository stored in a memory of the electronic system;
  a personalized menu; and
  a secure transaction path.

14. The processing system according to claim 12, wherein the one or more processors are further configured to:
  determine that placement of the valid biometric object is maintained for a threshold amount of time before enabling access to the secure object.

15. The processing system according to claim 12, wherein the one or more processors are further configured to:
  provide for navigation and selection of items within the secure object based on a second input on the input surface.

16. The processing system according to claim 15, wherein disabling the access to the secure object is further based on the second input being removed from the input surface.

17. A method for using an input device of an electronic system to provide secure access, the method comprising:
  receiving, by a processing system, biometric information relating to a user from a biometric sensor, wherein the received biometric information corresponds to a biometric object of the user being placed on the biometric sensor;
  enabling, by the processing system, in response to determining that the biometric information is valid, access to a secure object of the electronic system while the biometric object is maintained on the biometric sensor;
  determining, by the processing system, that the biometric object has been removed from the biometric sensor; and
  disabling, by the processing system, in response to removal of the biometric object from the biometric sensor, access to the secure object;
  wherein the method further comprises: prior to enabling access to the secure object, authenticating the user based on the determined biometric information so as to determine that the biometric object placed on the biometric sensor is valid;
  wherein enabling access to the secure object of the electronic system while the valid biometric object is maintained on the biometric sensor further comprises: causing information to be displayed on a display of the electronic system while the valid biometric object is maintained on the biometric sensor, wherein the displayed information is hidden when the valid biometric object is not on the biometric sensor.

18. The method according to claim 17, wherein the secure object comprises at least one of the group consisting of: a file repository stored in a memory of the electronic system; a personalized menu; and a secure transaction path.

19. The method according to claim 17, further comprising: before enabling access to the secure object, determining, by the processing system, that placement of the valid biometric object is maintained for a threshold amount of time.

20. The method according to claim 17, further comprising: providing, by the processing system, for navigation and selection of items within the secure object based on a second input on the input surface.

* * * * *